April 28, 1970     W. T. GRUBB ETAL     3,508,970
TUBULARLY HOUSED FUEL CELL
Filed Dec. 30, 1966
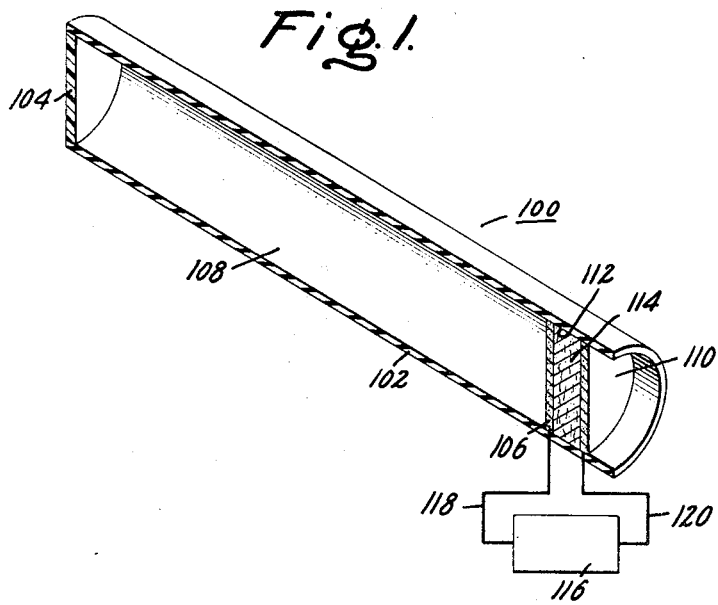
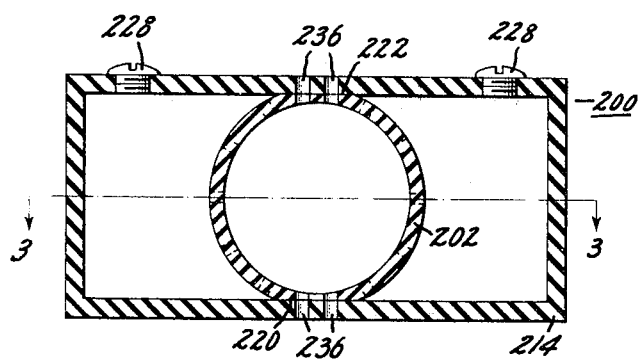
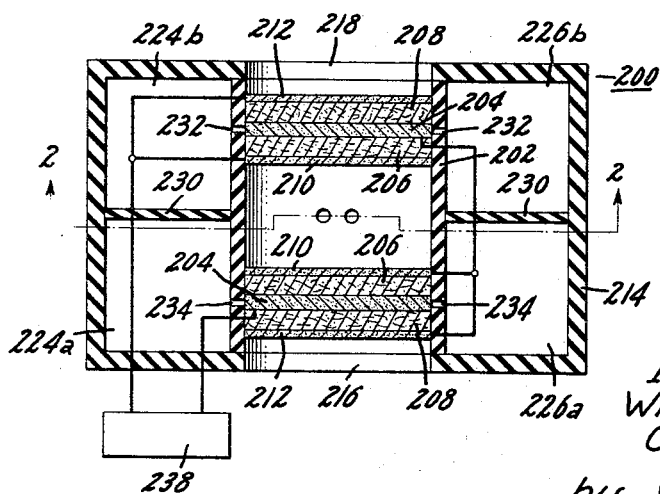
Inventors:
Willard T. Grubb,
Carl E. Cliche,
by Carl O. Thomas
Their Attorney.

United States Patent Office 3,508,970
Patented Apr. 28, 1970

3,508,970
TUBULARLY HOUSED FUEL CELL
Willard T. Grubb, and Carl E. Cliche, Schenectady, N.Y., assignors to General Electric Company, a corporation of New York
Filed Dec. 30, 1966, Ser. No. 606,225
Int. Cl. H01m 27/00
U.S. Cl. 136—86                    3 Claims

ABSTRACT OF THE DISCLOSURE

The invention is directed to a fuel cell enclosed in a tubular housing including a cathode passive toward a water soluble fuel and an anode for the electrochemical oxidation of the water soluble fuel. An aqueous alkaline electrolyte ionically communicates the anode and the cathode, and a mixture of dissolved fuel and electrolyte lies in a fuel chamber in communication with the anode.

Our invention is believed to be classifiable with primary batteries having gas electrodes.

The construction of fuel cells utilizing methanol as a fuel and air as an oxidant is generally known in the art. In one form such a fuel cell may be constructed with a porous anode capable of catalytically oxidizing methanol and a porous cathode capable of catalytically reducing oxygen from air but catalytically passive toward methanol. An aqueous alkaline electrolyte is employed to ionically communicate the electrodes, and a mixture of electrolyte and methanol is supplied to the anode.

It is the purpose of our invention to provide a novel fuel cell unit which is capable of reliably meeting low power requirements over extended periods. It is a specific purpose to provide a fuel cell unit of low volume displacement and light weight suitable for utilization in many applications now assigned to Leclanche cells.

Our invention may be better understood by reference to the following detailed description considered in conjunction with the drawings, in which FIGURE 1 is an isometric view, partly in section, of a fuel cell unit constructed according to our invention;

FIGURE 2 is a vertical section, taken along section line 2—2 in FIGURE 3, of an alternate fuel cell unit construction; and FIGURE 3 is a horizontal section, taken along section line 3—3 in FIGURE 2 of the same fuel cell unit.

The purposes of our invention are accomplished by providing a fuel cell unit, which in one form, is comprised of an open ended tubular housing having a liquid impervious plug sealingly cooperating therewith. A porous anode means is mounted within the housing and spaced from the plug to define a fuel chamber therebetween adapted to contain a mixture of a water soluble fuel and an aqueous alkaline electrolyte. A porous cathode means catalytically passive toward the fuel is mounted within the housing spaced from the anode means to form an electrolyte chamber adapted to confine a portion of the aqueous alkaline electrolyte, and means are provided for connecting an electrical load between the anode means and the cathode means.

In another form, our invention is directed to a fuel cell unit comprised of a tubular housing having a porous anode means for the electrochemical oxidation of a dissolved fuel bridging the interior thereof. Means are provided to block the anode means from contact with ambient air including a porous cathode means catalytically passive toward the dissolved fuel mounted within the housing spaced from the anode means to define an electrolyte chamber therebetween. An aqueous alkaline electrolyte is confined within the electrolyte chamber. Means are provided to form a fuel chamber for confining a mixture of aqueous electrolyte and the dissolved fuel in communication with the anode means, and means are provided for connecting an electrical load between the anode means and the cathode means.

Noting FIGURE 1, a fuel cell unit 100 is illustrated including an open ended tubular housing 102. While the tubular housing is shown to be of circular cross section, it is appreciated that it could just as well be of any desired cross-sectional configuration—i.e., elliptical, polygonal, irregular, etc. A liquid impervious plug 104 is mounted adjacent one end of the tubular housing. Mounted within the housing and spaced from the liquid impervious plug is a porous anode 106. The spacing between the plug and the porous anode defines a fuel chamber 108. Within this chamber a mixture of electrolyte and dissolved fuel, not shown, are normally confined.

Lying within the housing spaced from one end and spaced from the anode is a porous cathode 110. The cathode is comprised of an electrocatalyst which is capable of reducing oxygen from air, but which is incapable of oxidizing methanol. An electrolyte chamber 112 is defined between the anode and the cathode. A portion of the aqueous alkaline electrolyte confined in the fuel chamber extends into the electrolyte chamber. Preferably the electrolyte is held by capillary action in an immobilizing matrix 114. An electrical load 116 is schematically illustrated connected to the anode by an electrical lead 118 and to the cathode by an electrical lead 120.

The elements which make up the fuel cell unit 100 are per se conventional. The tubular housing may be formed of any electrically insulative material. Glass and plastic tubing are examples of suitable housing materials. Alternately, the tubular housing could be formed of metal tubing having an electrically insulative internal lining or coating. This lining or coating could, if desired, be limited to the area at which the cathode and/or anode contact the housing.

The liquid impervious plug may be simply a stopper. Preferably, a plug is chosen that is gas pervious but liquid impervious. Plugs of this type are formed by providing small diameter perforations in hydrophobic materials. For example suitable liquid impervious, gas pervious plugs may be formed by perforating a polytetrafluoroethylene plug or in coating a thin layer of a hydrophobic resin on a cloth backing. Any conventional liquid impervious, gas pervious plug may be employed. It is recognized that the plug could, if desired, be formed integrally with the tubular housing. Also, when the fuel cell unit is vertically oriented, the plug may be omitted entirely.

It is preferred to utilize a readily oxidizable water soluble fuel in the fuel cell unit such as methanol, ethanol, propanol, isopropanol, ethylene glycol, glycerol, etc. Generally, any mono- or poly-hydric alcohol having less than about four carbon atoms per molecule may be employed. Also, alkali metal formates may be incorporated. These materials may be used singly or in combination. Since these materials are fully miscible with water in widely varying proportions, the concentration employed may be varied as desired. Of the above fuels methanol is preferred because of its comparatively low cost and because it easily oxidizes completely leaving no unreacted residue in the unit.

The electrolyte incorporated in the fuel and electrolyte chambers may be any conventional aqueous alkaline electrolyte. For practical reasons alkali hydroxides are employed almost universally, although it is recognized that less common, more expensive hydroxides, such as the quaternary ammonium hydroxides or the quaternary phosphonium hydroxides, for example, could be used as well. The concentration of the electrolyte is not critical, as is generally appreciated in the art. Generally, all proportions of electrolyte to fuel are operable. The most efficient proportions for any given fuel will be determined by the particular reaction stoichiometry for that fuel. For example, it is preferred that the molar ratio of hydroxide to methanol in the fuel chamber be at least two to one, or higher. This is because two molecules of hydroxide are consumed for each molecule of methanol. Accordingly, providing excess hydroxide assures that all the available methanol may be consumed in use. Also, it assures that the hydroxide concentration will remain desirably high throughout the operation of the fuel cell unit. Excess hydroxyl ions are desirable to facilitate the reactions occurring at the electrodes.

Any conventional porous anode that is capable of electrochemically oxidizing the fuel may be employed in the fuel cell unit. The platinum metals are known to be excellent catalysts for this reaction. Accordingly, it is preferred to use conventional porous platinum metal fuel cell anodes. The anode may be a separate structural element or merely a thin coating of a platinum metal in finely divided form supported as a coating on the immobilizing matrix 114. One anode construction preferred for its low cost is a carbon disk activated with a platinum metal.

The porous cathode is comprised of an electrocatalyst that is active toward oxygen, but passive toward the fuel. Spinels are a prime example of such electrocatalysts. Also, unactivated carbon is suitable. Suitable cathode electrocatalysts are disclosed by Grimes et al. Patent No. 3,163,560, issued Dec. 29, 1964, and Adam et al. Patent No. 3,266,939, issued Aug. 16, 1966. Attention is also directed to French Patent No. 1,371,815, filed May 24, 1963, issued Aug. 3, 1964, which discloses both anode and cathode structures of the type required. A wide variety of conventional techniques are known for forming porous anodes and cathodes of the type indicated, and therefore no detailed discussion is deemed necessary.

The use of an electrolyte immobilizing matrix is optional, but preferred. Any porous matrix penetrable by the electrolyte and inert with respect thereto as well as methanol may be employed. The matrix in one preferred form is comprised of a compacted disk of asbestos. In another form the matrix may be formed of an electrolyte permeable plastic disk, such as an ion exchange membrane, either cation or anion. In such case the cation exchange membrane would not contribute itself to ionic conductivity. The function of the matrix is to hold the electrolyte immobilized against leakage from the unit by capillary forces. If desired, the matrix could be omitted and the cathode relied upon to prevent leakage of electrolyte from the unit. In this instance, it is necessary that the cathode be wet-proofed so as to be gas pervious and liquid impervious. The construction of such cathodes is well understood in the art. In the simplest form such a cathode may be formed by merely forming a thin layer of a hydrophobic material adjacent the outer face of the cathode.

Although, one of the distinct advantages of our fuel cell unit is the ease with which it can be manufactured and assembled, this is considered to be sufficiently obvious so as not to require detailed description.

The fuel cell unit may be placed in operation by filling the fuel chamber 108 with a mixture of electrolyte and dissolved fuel and connecting the electrical load 116 across the anode and the cathode using electrical leads 118 and 120, respectively. It is not necessary to separately supply electrolyte to the electrolyte chamber 112, since electrolyte will permeate through the porous anode and enter this chamber. However, impregnation of the immobilizing matrix 114 with electrolyte at the time of assembling the fuel cell unit is possible. According to one technique the fuel chamber may be charged by removing the plug. Having a removable plug is particularly advantageous in recharging the unit, since it is also necessary at this time to discharge spent solution from the fuel chamber.

The fuel reacts at the anode with the hydroxyl groups of the electrolyte to form water and carbonate anions. For each molecule of methanol that reacts at the anode, for example, six electrons are liberated, which flow through the external circuit to supply electrons consumed at the cathode reaction, which is the reduction of oxygen from the air to form hydroxyl ions by reaction with water.

Should any gas be formed in the cell during use, it may leave the fuel cell unit through the gas pervious, liquid impervious plug. It is appreciated that no gas formation should occur under normal operating conditions. Accordingly, the fuel cell unit is attitude insensitive—that is, operable in any special orientation—and does not require any particular plug. If gas should accumulate in the fuel chamber, however, and the fuel cell unit were being operated with the end of the housing adjacent the cathode at the highest elevation, gas would accumulate between the anode and the fuel-electrolyte mixture. This would stop operation of the cell. Accordingly, it is preferred to operate the unit horizontally or with the end of the housing having the plug elevated. The use of a gas pervious plug further insures that the unit, even when abused, would not develop an internal pressure.

Another optional feature of the unit is that the cathode is mounted in the housing recessed from the end thereof. Should the cathode become slightly heated in operation and the cathode were flush mounted with the end of the housing convection currents would develop tending to dry moisture from the unit. By recessing the cathode, convection currents are minimized and the possibility of excessive moisture loss is obviated.

FIGURES 2 and 3 illustrate as an alternate construction a fuel cell unit 200. The unit is comprised of an open ended tubular housing 202. Mounted within the housing spaced inwardly from one end thereof is an anode 204 blocked from contact with the ambient air by electrolyte immobilizing matrices 206 and 208. Porous cathodes 210 and 212 lie adjacent the matrices. An identical arrangement is provided in the tubular housing spaced inwardly of the opposite end.

A second housing 214 surrounds the tubular housing and is provided with openings 216 and 218 aligning with the tubular housing, which is sealed to the second housing peripherally of the openings. The second housing is also sealed to the tubular housing along surfaces 220 and 222. Two partitions 230 are also provided sealed between the tubular housing and the second housing. It is thus apparent that four separate fuel chambers are formed, herein designated 224a, 224b, 226a, and 226b. A plurality of removable plugs 228 are provided for introducing fuel and electrolyte into the respective fuel chambers. To communicate the fuel chambers 224a and 226a and the adjacent anode a plurality of ports 234 are provided. Similarly, to communicate the chambers 224b and 226b and the adjacent anode a plurality of ports 232 are provided. To allow air to contact the innermost cathodes 210 a plurality of air passages 236 are provided.

It is apparent that the fuel cell unit 200 forms two separate fuel cells. For purposes of illustration, these cells are schematically shown connected electrically in series to a load 238. If desired, the separate fuel cells could be electrically connected in parallel. In such case partitions 230 may be eliminated, since electrical connection of the anodes through the electrolyte in such case would not be undesirable. Even when the cells are connected in series, it is recognized that by properly controlling the spacing between ports 232 and 234, their size, and number that the shunt currents between the anodes may be maintained inconsequentially small. It is further appreciated that since four separate electrolyte chambers are present four fuel cells may be mounted within the tubular housing and electrically connected in series without encountering shunt currents. Larger numbers of fuel cells could, of course, be positioned within the housing by suitably partitioning the second housing 214, or, in the case of electrical parallel interconnection, without partitioning the second housing.

Except for the structural distinctions noted above, the fuel cell unit 200 is similar to the fuel cell unit 100. Accordingly, its use and function is considered sufficiently obvious so as not to require further detailed description.

While we have described our invention with reference to certain preferred embodiments, it is appreciated that numerous modifications will readily occur to those skilled in the art. It is accordingly intended that the scope of our invention be determined with reference to the following claims.

What we claim as new and desire to secure by Letters Patent of the United States is:

1. A fuel cell unit comprised of
   an open ended tubular housing,
   a porous anode means for the electrochemical oxidation of a dissolved fuel bridging the interior of said housing,
   means blocking said anode means from contact with ambient air comprising a pair of porous cathode means catalytically passive toward the dissolved fuel mounted within said housing spaced from opposite sides of said anode means to define an electrolyte chamber between said anode means and each of said cathode means,
   an aqueous alkaline electrolyte confined within each electrolyte chamber,
   means encompassing said tubular housing forming a fuel chamber for confining a mixture of aqueous electrolyte and the dissolved fuel, and
   said tubular housing including at least one port in communication with said anode means and said fuel chamber means.

2. A fuel cell unit according to claim 1 additionally including a second porous anode means and a second blocking means identically related as said anode means and said blocking means as first recited and mounted spaced therefrom within said tubular housing,
   said fuel chamber means forming two separate fuel chambers each confining a mixture of dissolved fuel and aqueous alkaline electrolyte,
   said tubular housing including ports extending from one of said fuel chambers to one of said anode means and from the other of said fuel chambers to the other of said anode means, and
   said fuel chamber means and said tubular housing including at least one air port extending therethrough in communication with the space between the opposing cathode means.

3. A fuel cell unit according to claim 2 additionally including means electrically connecting said anode means and said cathode means in series.

References Cited

UNITED STATES PATENTS

| | | | |
|---|---|---|---|
| 273,739 | 3/1883 | Ablochkoff | 136—83 |
| 2,797,254 | 6/1957 | Schumacher et al. | 136—136 |
| 2,901,523 | 8/1959 | Justi et al. | 136—86 |
| 2,925,454 | 2/1960 | Justi et al. | 136—86 |
| 2,925,455 | 2/1960 | Eidensohn et al. | 136—86 |
| 3,057,945 | 10/1962 | Rennovalore et al. | 136—83 |
| 3,143,440 | 8/1964 | Hunger et al. | 136—86 |
| 3,258,415 | 6/1966 | Kordesch | 136—86 |

WINSTON A. DOUGLAS, Primary Examiner

H. A. FEELEY, Assistant Examiner